United States Patent
Huang et al.

(10) Patent No.: US 9,571,743 B2
(45) Date of Patent: Feb. 14, 2017

(54) DYNAMIC EXPOSURE ADJUSTING METHOD AND ELECTRONIC APPARATUS USING THE SAME

(71) Applicant: Acer Incorporated, New Taipei (TW)

(72) Inventors: Shih-Ting Huang, New Taipei (TW); Jian-Wei Lee, New Taipei (TW); Wu-Chu Tsai, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/585,204

(22) Filed: Dec. 30, 2014

(65) Prior Publication Data

US 2015/0244917 A1    Aug. 27, 2015

(30) Foreign Application Priority Data

Feb. 25, 2014  (TW) ............... 103106316 A

(51) Int. Cl.
*H04N 5/228* (2006.01)
*H04N 5/235* (2006.01)
*H04N 5/225* (2006.01)

(52) U.S. Cl.
CPC ......... *H04N 5/2353* (2013.01); *H04N 5/2355* (2013.01)

(58) Field of Classification Search
None
See application file for complete search history.

(56) References Cited

U.S. PATENT DOCUMENTS

| 2011/0096192 A1 | 4/2011 | Nikura | |
|---|---|---|---|
| 2011/0187914 A1* | 8/2011 | Lee | H04N 5/222 348/333.11 |
| 2013/0195345 A1* | 8/2013 | Nammoto | G06T 7/001 382/141 |
| 2014/0022408 A1* | 1/2014 | Nashizawa | H04N 5/2355 348/222.1 |

FOREIGN PATENT DOCUMENTS

| TW | 200830896 | 7/2008 |
|---|---|---|
| TW | 201338519 | 9/2013 |

* cited by examiner

*Primary Examiner* — Aung S Moe
*Assistant Examiner* — Euel Cowan
(74) *Attorney, Agent, or Firm* — Jianq Chyun IP Office

(57) ABSTRACT

A dynamic exposure adjusting method and an electronic apparatus using the same are provided. The method includes the following steps: capturing a plurality of preview images, a plurality of additional images and a first image, wherein the additional images are not displayed in a display unit of the electronic apparatus; analyzing a luminance distribution condition of the first image; obtaining a long exposure time and a short exposure time according to the luminance distribution condition; retrieving at least one specific image corresponding to the long exposure time and the short exposure time from the additional images; combining the first image with the at least one specific image as a processed image.

7 Claims, 7 Drawing Sheets

DYNAMIC EXPOSURE ADJUSTING METHOD AND ELECTRONIC APPARATUS USING THE SAME

CROSS-REFERENCE TO RELATED APPLICATION

This application claims the priority benefit of Taiwan application serial no. 103106316, filed on Feb. 25, 2014. The entirety of the above-mentioned patent application is hereby incorporated by reference herein and made a part of this specification.

BACKGROUND OF THE INVENTION

Field of the Invention

The invention relates to an exposure adjusting method and an electronic apparatus using the same, and particularly relates to a dynamic exposure adjusting method and an electronic apparatus using the same.

Description of Related Art

Most of the electronic apparatuses that are capable of taking pictures, such as digital cameras or smart phones, are now provided with the high dynamic range (HDR) function. When the HDR function is activated, the electronic apparatuses are allowed to improve the display of the bright and shadow details. Thus, objects in the picture are clear.

The conventional HDR technique mainly serves to obtain the best display when taking a picture. Namely, shadow details of the picture should be clear and there should be no over exposure in a bright scene. Thus, when taking the picture, a plurality of pictures having different exposure values are to be combined to form a preferable HDR picture. First of all, to obtain clear shadow details, the electronic apparatus may take a picture with a long exposure, so that a darker region in the scene becomes brighter. Then, in the same scene, the electronic apparatus may take a picture with a short exposure, so that a brighter region in the scene becomes darker to avoid over exposure.

Referring to FIG. 1, FIG. 1 is a schematic view illustrating the conventional high dynamic range (HDR) technology. When the electronic apparatus takes a picture with the HDR function activated, the electronic apparatus may simultaneously take pictures 110, 120, and 130. The picture 110 is a short exposure picture taken based on an exposure value (EV) of ½, for example, which is used to shoot a part having a higher brightness in the scene (e.g. region 115). The picture 120 is a normally exposed picture taken by the electronic apparatus based on an exposure value of 1 EV. The picture 130 is a long exposure picture taken based on an exposure value of 2 EV, for example, which is used to shoot a part having a lower brightness in the scene (e.g. region 135). Then, the electronic apparatus may combine the pictures 110, 120, and 130 to form a picture 140. Thus, the picture 140 may simultaneously show clear shadow details and have no over exposure in the bright scene.

However, in the conventional technology, it is common to use fixed values for the long and short exposure times (e.g. ½ EV and 2 EV as described above). In other words, regardless of the scene, the electronic apparatus consistently uses the fixed short exposure time and long exposure time to execute the HDR function when taking pictures. Taking FIG. 1 as an example, the HDR mechanism described therein takes three pictures based on ½ EV, 1 EV, and 2 EV during every shooting, and combining the three pictures as the final picture.

Thus, in some extreme scenes (e.g. taking a human image in a severe backlight environment), the HDR function may be almost ineffective when the electronic apparatus takes a picture with the HDR function activated. Specifically speaking, the HDR function is not able to compensate for the human image and scene in the picture to obtain a preferable picture (e.g. clear shadow details and no over exposure in the bright scene).

SUMMARY OF THE INVENTION

In view of the above, the invention provides a dynamic exposure adjusting method and an electronic apparatus using the same, which are capable of adaptively adjusting a long exposure time and a short exposure time based on a scene that a first image corresponds to, so as to obtain a preferable picture when performing an HDR function.

The invention provides a dynamic exposure adjusting method adapted for an electronic apparatus. The method includes steps as follows: capturing a plurality of preview images, a plurality of additional images, and a first image, wherein the additional images are not displayed in a display unit of the electronic apparatus; analyzing a luminance distribution condition of the first image; obtaining a long exposure time and a short exposure time according to the luminance distribution condition; retrieving at least one specific image corresponding to the long exposure time and the short exposure time from the additional images; and combining the first image and the at least one specific image as a processed image.

The invention provides an electronic apparatus, including a display unit, an image capturing module, a storage unit, and a processing unit. The storage unit stores a plurality of modules. The processing unit is coupled with the display unit, the image capturing module, and the storage unit, and accesses the modules to perform steps as follows: controlling the image capturing module to capture a plurality of preview images, a plurality of additional images, and a first image, wherein the additional images are not displayed in a display unit of the electronic apparatus; analyzing a luminance distribution condition of the first image; obtaining a long exposure time and a short exposure time according to the luminance distribution condition; retrieving at least one specific image corresponding to the long exposure time and the short exposure time from the additional images; and combining the first image and the at least one specific image as a processed image.

The invention provides an electronic apparatus, including a display unit, an image capturing module, a storage unit, and a processing unit. The image capturing module includes a first image capturing unit and at least one second image capturing unit. The storage unit stores a plurality of modules. The processing unit is coupled with the display unit, the image capturing module, and the storage unit, and accesses the modules to perform steps as follows: controlling the first image capturing unit to capture a first image; analyzing a luminance distribution condition of the first image; obtaining a long exposure time and a short exposure time according to the luminance distribution condition; adjusting an exposure time individually corresponding to the at least one second image capturing unit according to the long exposure time and the short exposure time; controlling the at least one second image capturing unit to capture a plurality of specific images based on the corresponding exposure time; and combining the first image and the specific images as a processed image.

Based on the above, the dynamic exposure adjusting method and the electronic apparatus using the same may adaptively adjust the long exposure time and short exposure time based on the scene that the first image corresponds to. In this way, regardless of the scene that the first image corresponds to, the dynamic exposure adjusting method provided in the embodiment of the invention is capable of obtaining a preferable processed picture (e.g. having clear shadow details and no over exposure in a bright scene).

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
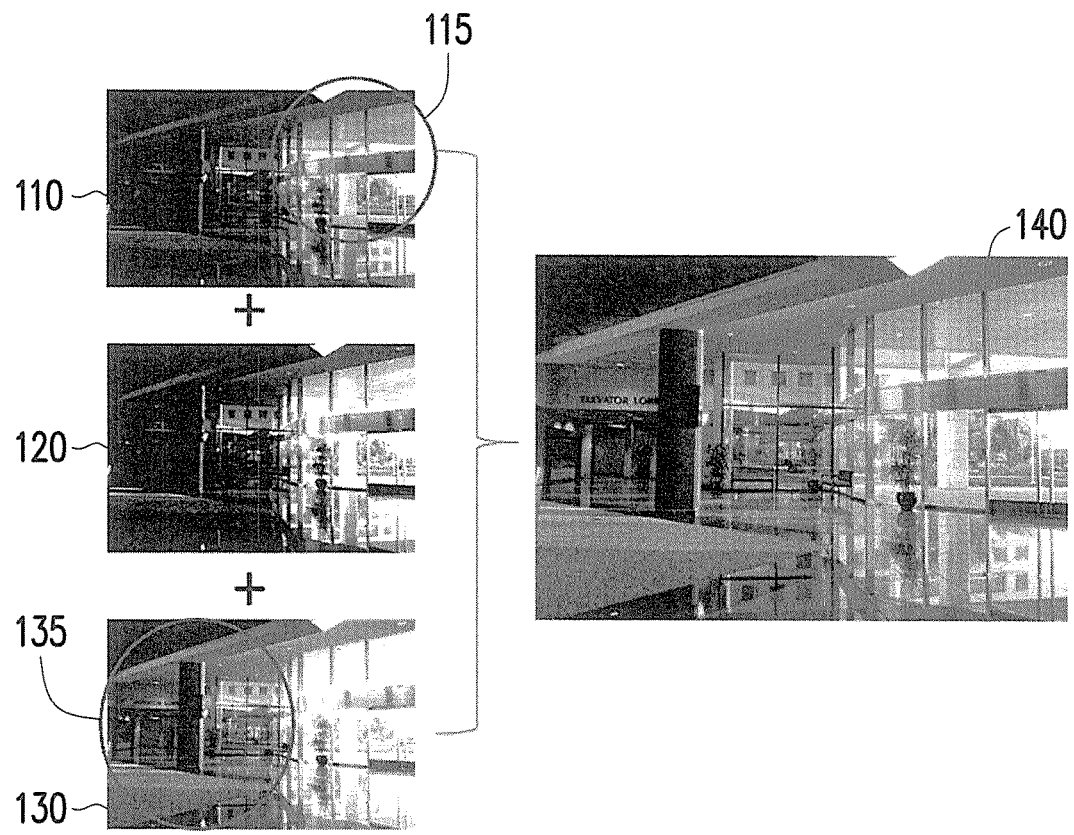
FIG. 1 is a schematic view illustrating the conventional high dynamic range (HDR) technology.

Reference will now be made in detail to the present preferred embodiments of the invention, examples of which are illustrated in the accompanying drawings. Wherever possible, the same reference numbers are used in the drawings and the description to refer to the same or like parts.

Figure 2:
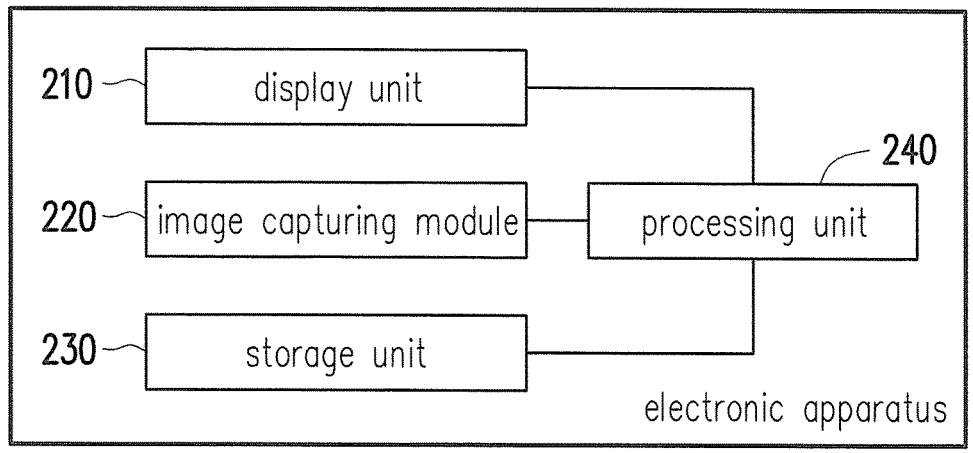
FIG. 2 is a functional block diagram illustrating an electronic apparatus according to an embodiment of the invention.

FIG. 2 is a functional block diagram illustrating an electronic apparatus according to an embodiment of the invention. In this embodiment, an electronic apparatus 200 includes a display unit 210, an image capturing module 220, a storage unit 230, and a processing unit 240. The electronic apparatus 200 is a smart phone, tablet, personal digital assistant (PDA), personal computer (PC), notebook PC, work station, or other similar computer apparatuses, for example.

The display unit 210 may include at least one of the following: a liquid crystal display (LCD), thin film transistor (TFT)-LCD, organic light-emitting diode (OLED), flexible display, three-dimensional (3D) display, etc. The image capturing module 200 includes an image capturing element realized by a charge coupled device (CCD) and/or a complementary metal oxide semiconductor (CMOS), for example. The storage unit 230 is a memory, hard disk, or any other elements configured to store data. In addition, the storage unit 230 may record a plurality of modules.

The processing unit 240 is coupled with the display unit 210, the image capturing module 220, and the storage unit 230. The processing unit 240 may be a general-purpose processor, specific-purpose processor, conventional processor, digital signal processor, a plurality of microprocessors, one or more microprocessors combined with a digital signal processor core, controller, micro-controller, application specific integrated circuit (ASIC), field programmable gate array (FPGA) circuit, any kind of integrated circuits, state machine, processor of advanced RISC machine (ARM), and similar products.

In this embodiment, the processor 240 may access the plurality of modules (or programming codes) stored in the storage unit 230 to perform each step of a dynamic exposure adjusting method of the invention.

Figure 3:
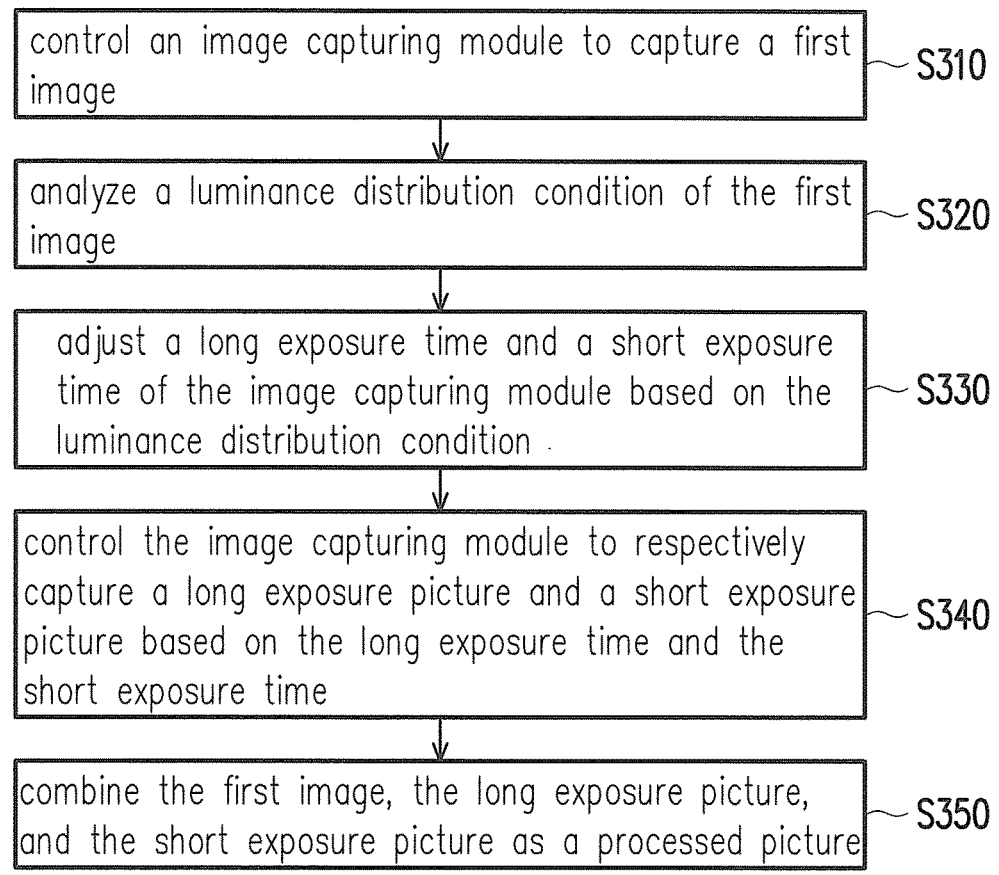
FIG. 3 is a flowchart illustrating a dynamic exposure adjusting method according to an embodiment of the invention.

FIG. 3 is a flowchart illustrating a dynamic exposure adjusting method according to an embodiment of the invention. The method described in the embodiment is suitable for the electronic apparatus 200 shown in FIG. 2. In the following, each step of the embodiment is described with the elements shown in FIG. 2.

At Step S310, the processing unit 240 may control the image capturing module 220 to capture a first image. Then, at Step S320, the processing unit 240 may analyze a luminance distribution condition of the first image.

In one embodiment, the processing unit 240 may use a block-based analysis to analyze the luminance distribution condition of the first image. Specifically speaking, the processing unit 240 divides the first image into a plurality of blocks, and individually calculates a luminance value corresponding to each of the blocks. For example, the processing unit 240 may divide the first image into 72×54 blocks. However, the invention is not limited thereto. Then, the processing unit 240 may calculate a first number of a bright block and a second number of a dark block in the first image according to the luminance values of the blocks.

Specifically speaking, the processing unit 240 may categorize a block having a luminance value higher than a predetermined luminance threshold in the blocks as the bright block. Meanwhile, the processing unit 240 may also categorize a block having a luminance value lower than the predetermined luminance threshold in the blocks as the dark block. In one embodiment, if the luminance value is a numerical value between 0 to 225, the predetermined luminance threshold may be set at 163. Thus, the processing unit 240 may categorize a block having a luminance value higher than 163 as the bright block, and categorize a block having a luminance value lower than 163 as a dark block. In other embodiments, the predetermined luminance threshold may be set as other values (e.g. an average value of the luminance values of all of the blocks) based on the designer's consideration. Then, the processing unit 240 may respectively calculate the first number of the bright block and the second number of the dark block.

Figures 4A, 4B:
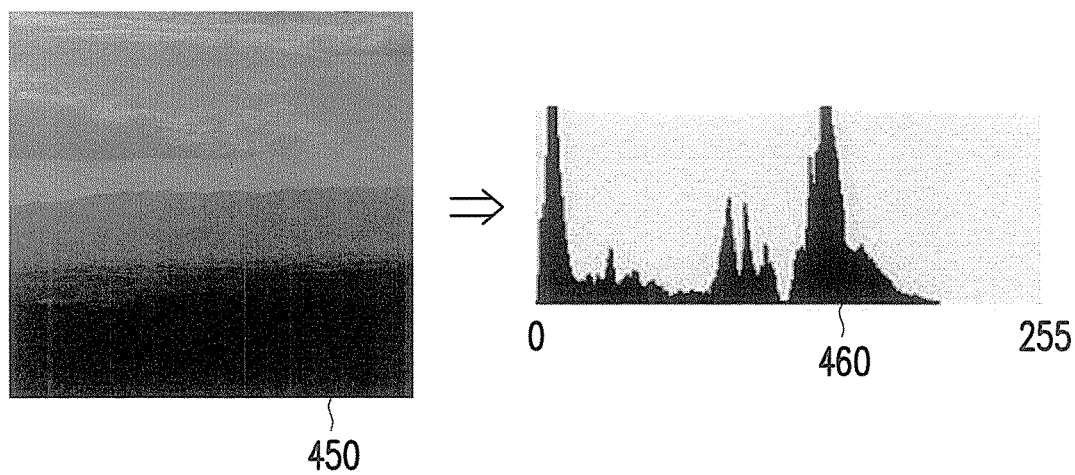
FIG. 4A is a schematic view illustrating an analysis on luminance distribution according to an embodiment of the invention.
FIG. 4B is a schematic view illustrating an analysis on luminance distribution according to an embodiment of the invention.

Referring to FIG. 4A, FIG. 4A is a schematic view illustrating an analysis on luminance distribution according to an embodiment of the invention. In this embodiment, the processing unit 240 may divide the first image into 5×5 blocks, where the luminance values of blocks AA and BB are respectively 0 and 255, for example. Based on the description of the previous embodiment, the processing unit 240 may categorize the blocks AA as the dark blocks, and categorize the blocks BB as the bright blocks. Then, the processing unit 240 may respectively calculate that the first number of the bright blocks is 16, and the second number of the bright blocks is 9. People having ordinary skills in the art shall appreciate that the figure of this embodiment only serves to provide an example, instead of serving to limit the embodiment of the invention.

In addition to the block-based analysis as previously described, the processing unit 240 may use a luminance histogram analysis to analyze the luminance distribution condition of the first image in other embodiments. Specifically speaking, the processing unit 240 may generate a luminance histogram associated with the first image, where the luminance histogram may include a number of data (e.g. pixel) corresponding to the respective luminance values. Then, the processing unit 240 may categorize a data having a luminance value higher than the predetermined luminance threshold in the data as the bright block. Meanwhile, the processing unit 240 may also categorize a data having a luminance value lower than the predetermined luminance threshold in the data as the dark block.

Referring to FIG. 4B, FIG. 4B is a schematic view illustrating an analysis on luminance distribution according to an embodiment of the invention. In this embodiment, the processing unit 240 may generate a luminance histogram 460 associated with a first image 450 according to the first image 450. The X-axis of the luminance histogram 460 refers to the luminance value, and a range of the luminance value is between 0 and 255, for example. The Y-axis of the luminance histogram 460 is the number of data, for example. Then, the processing unit 240 may calculate a number of data having a luminance value higher than the predetermined luminance threshold (e.g. 170), and set the number of data as the first number. Meanwhile, the processing unit 240 may calculate a number of data having a luminance value lower than the predetermined luminance threshold (e.g. 170), and set the number of data as the second number.

Referring to FIG. 3 again, at Step S330, the processing unit 240 may adjust a long exposure time and a short exposure time of the image capturing module 220 based on the luminance distribution condition.

Specifically speaking, when the first number is larger than the second number, a scene in the first image corresponds to a scene having a higher luminance. Thus, when the processing unit 240 subsequently takes a short exposure picture for application of the high dynamic range (HDR) technique, an exposure time may be correspondingly shortened to avoid over exposure in the short exposure picture.

Taking the block-based analysis for example, if the first number and the second number are respectively 20 and 5, the scene of the first image corresponds to a scene having a higher luminance. At this time, the processing unit 240 may calculate a ratio value between the first number and the second number, and adjust the long exposure time and the short exposure time based on the ratio value. In this embodiment, the ratio value is 2/8 (i.e. 5/20), for example. Thus, the processing unit 240 may set the long exposure time and the short exposure time to be 8 times and ½ times, respectively. It shall be appreciated that the 8 times and ½ times indicated herein refer to multiples of a reference exposure time with respect to the long exposure time and the short exposure time. The reference exposure time is an exposure time for the image capturing module 220 to take a normally exposed picture (i.e. the first image). However, the invention is not limited thereto. In other embodiments, the processing unit 240 may maintain a numerator of the ratio value to be 2, so that the short exposure time is kept as ½ times of the reference exposure time.

Besides, when the first number is smaller than the second number, the scene in the first image corresponds to a scene having a lower luminance. Thus, when the processing unit 240 subsequently takes a long exposure picture for application of the high dynamic range (HDR) technique, an exposure time may be correspondingly lengthened to clearly present shadow details.

For example, if the first number and the second number are 10 and 15, respectively, the scene of the first image corresponds to a scene having a lower luminance. Thus, the processing unit 240 may calculate the ratio value between the first number and the second number, and adjust the long exposure time and the short exposure time based on the ratio value. In this embodiment, the ratio value is 2/3 (i.e. 10/15), for example. Thus, the processing unit 240 may set the long exposure time and the short exposure time to be 3 times and ½ times, respectively.

It should be noted that if the processing unit 240 uses the luminance histogram analysis to analyze the luminance distribution condition of the first image, the processing unit 240 may still determine the long exposure time and the short exposure time in a way similar to the block-based analysis. Namely, the processing unit 240 may also calculate the ratio value between the first number and the second number, and adjust the long exposure time and the short exposure time based on the ratio value. Details regarding the processing unit 240 adjusting the long exposure time and the short exposure time based on the ratio value may be referred to the description in the previous embodiment, so no further details in this respect will be reiterated hereinafter.

Then, at Step S340, the processing unit 240 may control the image capturing module 220 to respectively capture the long exposure picture and the short exposure picture based on the long exposure time and the short exposure time. Then, at Step 350, the processing unit 240 may combine the first image, the long exposure picture, and the short exposure picture as a processed picture. The processed picture is a picture generated after the electronic apparatus 200 performs a HDR function to the first image captured.

In this way, regardless of the scene that the first image corresponds to, the dynamic exposure adjusting method provided in the embodiment of the invention is capable of obtaining a preferable processed picture (e.g. having clear shadow details and no over exposure in a bright scene).

It should be noted that the dynamic exposure adjusting method of the invention may adaptively adjust the long exposure time and the short exposure time based on the scene that the first image corresponds to. Therefore, the dynamic exposure adjusting method of the invention is different from the conventional method having the short exposure time and long exposure time fixed.

Figure 5:
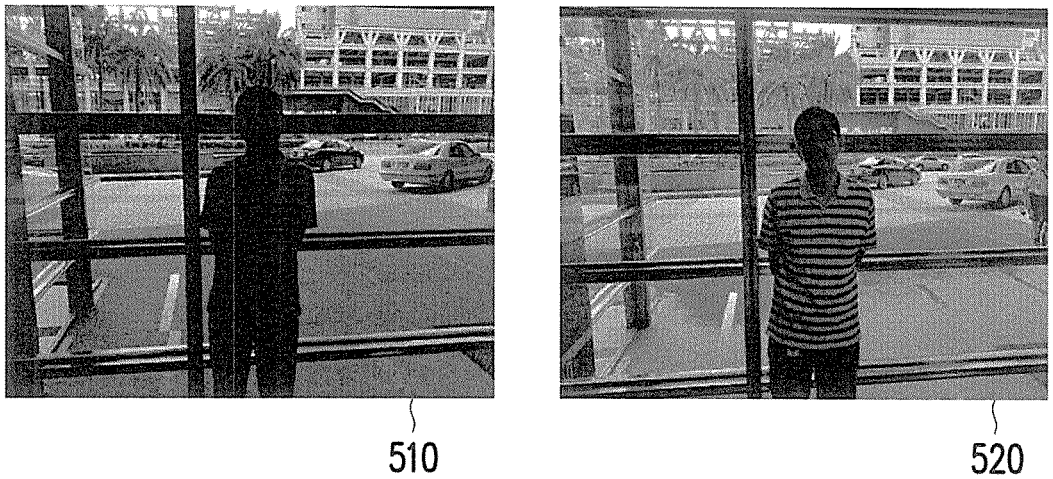
FIG. 5 is a schematic view illustrating embodying a dynamic exposure adjusting method according to an embodiment of the invention.

FIG. 5 is a schematic view illustrating embodying a dynamic exposure adjusting method according to an embodiment of the invention. In this embodiment, a processed image 510 is a picture processed with a conventional HDR function, for example. The processed image 510 is a picture combined by pictures having respective exposure values of ½ EV, 1 EV, and 2 EV, for example. Since an original scene that the processed image 510 corresponds to is in a severe backlight condition, an effect of the HDR function is significantly reduced. Specifically speaking, details of a human image in the processed image 510 are hardly observed due to the backlight.

A processed image 520, on the other hand, is an image generated based on the dynamic exposure adjusting method according to an embodiment of the invention. The processed image 520 is a picture combined by pictures having respective exposure values of ½ EV, 1 EV, and 5 EV, for example. Since the processing unit 240 may lengthen the exposure time when performing the dynamic exposure adjusting method, shadow details (e.g. the human image) in the processed image 520 may be more clearly presented.

In other embodiments, the invention also provides the dynamic exposure adjusting method embodied in other ways, which are also capable of achieving the aforementioned effects (e.g. clear shadow details and no over exposure in the bright scene). Details in this respect are described below.

Figure 6:
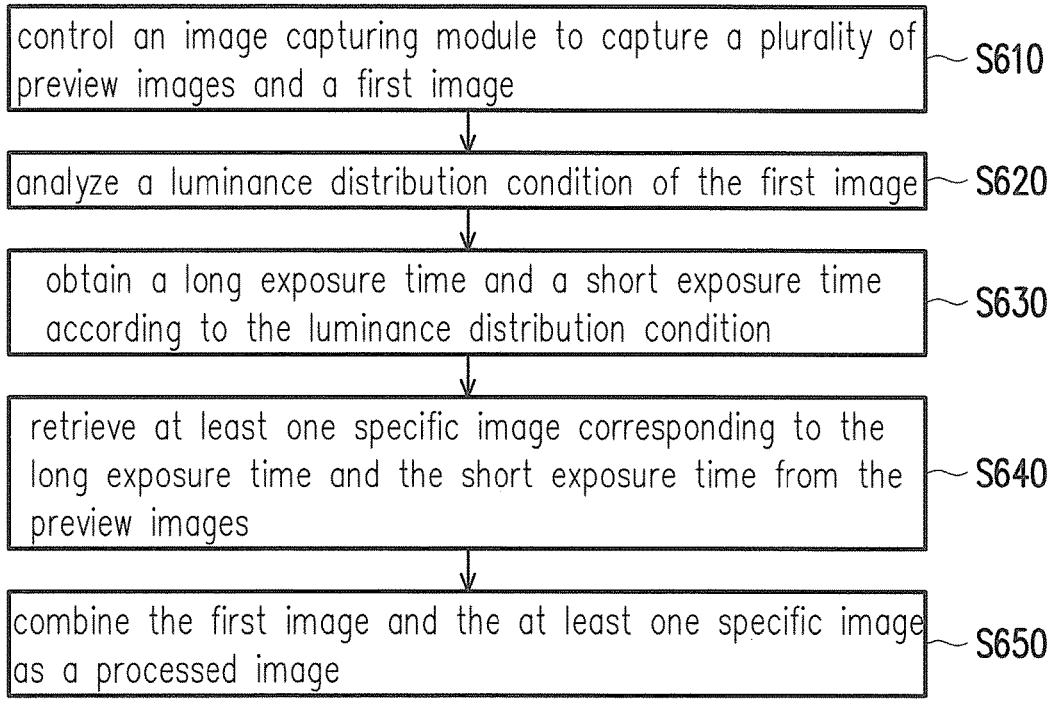
FIG. 6 is a flowchart illustrating a dynamic exposure adjusting method according to an embodiment of the invention.

FIG. 6 is a flowchart illustrating a dynamic exposure adjusting method according to an embodiment of the invention. The method described in the embodiment is suitable for the electronic apparatus 200 shown in FIG. 2. In the following, each step of the embodiment is described with the elements shown in FIG. 2.

At Step S610, the processing unit 240 may control the image capturing module 220 to capture a plurality of preview images and the first image. The preview images are, for example, images captured when the image capturing module 220 performs an auto exposure (AE) algorithm. Generally speaking, a frame rate used when the processing unit 240 controls the image capturing module 220 to capture the preview images is 60 frames per second (fps). Specifically speaking, when the image capturing module 220 operates based on the auto exposure algorithm, the image capturing module 220 is controlled by the processing unit 240 to dynamically adjust exposure times (or exposure values) of its element such as CMOS or CCD and capture the preview images based on the exposure times (or exposure values). In addition, while the image capturing module 220 adjusts the exposure times (or exposure values), the processing unit 240 may control the display unit 210 to display the preview images corresponding to each of the exposure times (or exposure values). Thus, the user may observe a change of images from bright to dark or from dark to bright.

The first image is, for example, an image captured by the image capturing module 220 in correspondence with an input of the user (e.g. pressing a shooting button).

Then, at Step S620, the processing unit 240 may analyze the luminance distribution condition of the first image. In this embodiment, the processing unit 240 may also analyze the luminance distribution condition of the first image based on the block-based analysis and luminance histogram analysis described previously. Details for embodying this step may be referred to relevant description in Step S320 of FIG. 2, so no further details in this respect will be reiterated hereinafter.

At Step 630, the processing unit 240 may obtain the long exposure time and the short exposure time according to the luminance distribution condition. Specifically speaking, the processing unit 240 may calculate the ratio value between the first number and the second number, and determine the long exposure time and the short exposure time based on the ratio value.

Taking the exemplary numerical values used in the previous embodiment for example, if the first number and the second number are respectively 20 and 5, the scene of the first image corresponds to a scene having a higher luminance. Thus, the processing unit 240 may calculate the ratio value between the first number and the second number, and obtain the long exposure time and the short exposure time based on the ratio value. In this embodiment, the ratio value is 2/8 (i.e. 5/20), for example. Thus, the processing unit 240 may respective obtain the long exposure time of 8 times and the short exposure time of ½ times.

Another example is that if the first number and the second number are 10 and 15, respectively, the scene of the first image corresponds to a scene having a lower luminance. At this time, the processing unit 240 may calculate the ratio value between the first number and the second number, and obtain the long exposure time and the short exposure time based on the ratio value. In this embodiment, the ratio value is 2/3 (i.e. 10/15), for example. Thus, the processing unit 240 may respective obtain the long exposure time of 3 times and the short exposure time of ½ times.

Then, at Step S640, the processing unit 240 may retrieve at least one specific image corresponding to the long exposure time and the short exposure time from the plurality of preview images.

Specifically speaking, as described in the previous embodiment, the preview images respectively correspond to different exposure times (or exposure values). Thus, the processing unit 240 may find a preview image having an exposure time that is the long exposure time from the preview images, and set the preview image so found as the first specific image. Meanwhile, the processing unit 240 may find a preview image having an exposure time that is the short exposure time from the preview images, and set the preview image so found as the second specific image.

Taking the exemplary numerical values previously used for example again, if the previously obtained long exposure time and short exposure time are 8 times and ½ times respectively, the processing unit 240 may find a preview image having an exposure time that is 8 times of the exposure time of the first image from the preview images and set the found preview image as the first specific image. In addition, the processing unit 240 may find a preview image having an exposure time that is ½ times of the exposure time of the first image from the preview images and set the found preview image as the second specific image.

Another example is that if the previously obtained long exposure time and short exposure time are 3 times and ½ times respectively, the processing unit 240 may find a preview image having an exposure time that is 3 times of the exposure time of the first image from the preview images and set the found preview image as the first specific image. In addition, the processing unit 240 may find a preview image having an exposure time that is ½ times of the exposure time of the first image from the preview images and set the found preview image as the second specific image.

Then, at Step S650, the processing unit 240 may combine the first image and the at least one specific image as the processed image. In this embodiment, the processing unit 240 may combine the first image, the first specific image, and the second specific image as the processed image.

Since the at least one specific images obtained by the processing unit 240 from the preview images respectively correspond to appropriate exposure times, the preferable processed image (e.g. clear shadow details and no over exposure in the bright scene) may be obtained after the at least one specific images are combined with the first image.

In other embodiments, the dynamic exposure adjusting method provided in the embodiments of the invention may further utilize additional images that are not displayed in the display unit 210 to obtain an even more preferable processed image when the processing unit 240 and the image capturing module 220 support a higher frame rate (e.g. 90 fps or 120 fps). Specifically speaking, a frame rate normally used by the display unit 210 is 60 fps. Thus, when the processing unit 240 and the image capturing module 220 support a frame rate such as 90 fps, the processing unit 240 and the image capturing module 220 may further capture a plurality of additional images having a frame rate of 30 fps (i.e. 90 fps–60 fps) in addition to the preview images. Thus, the processing unit 240 may further obtain a specific image more suitable to generate the processed image, thereby obtaining the processed image that is even more preferable.

Figure 7:
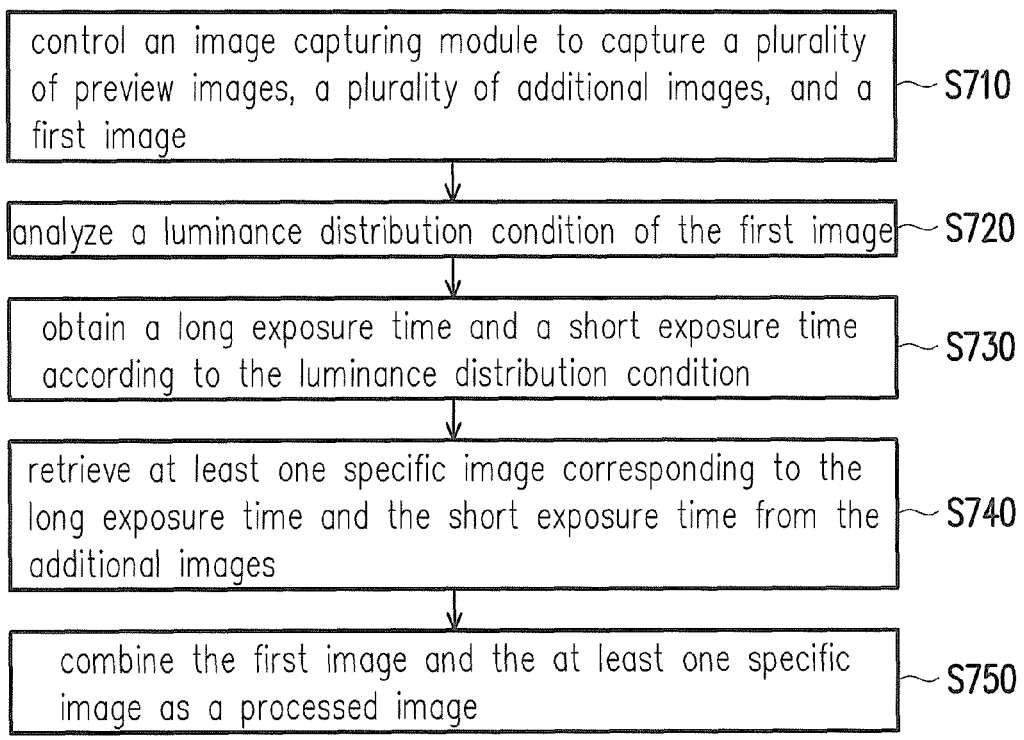
FIG. 7 is a flowchart illustrating a dynamic exposure adjusting method according to an embodiment of the invention.

FIG. 7 is a flowchart illustrating a dynamic exposure adjusting method according to an embodiment of the invention. The method described in the embodiment is suitable for the electronic apparatus 200 shown in FIG. 2. In the following, each step of the embodiment is described with the elements shown in FIG. 2.

At Step 710, the processing unit 240 may control the image capturing module 220 to capture the preview images, a plurality of additional images, and the first image. The preview images and the additional images are, for example, images captured when the image capturing module 220 performs the auto exposure algorithm. The additional images are, for examples, images not displayed in the display unit 210.

Then, at Step S720, the processing unit 240 may analyze the luminance distribution condition of the first image. In this embodiment, the processing unit 240 may also analyze the luminance distribution condition of the first image based on the block-based analysis and luminance histogram analysis described previously. Details for embodying this step may be referred to relevant description in Step S320 of FIG. 2, so no further details in this respect will be reiterated hereinafter.

At Step 730, the processing unit 240 may obtain the long exposure time and the short exposure time according to the luminance distribution condition. As described in the previous embodiment, the processing unit 240 may calculate the ratio value between the first number and the second number, and determine the long exposure time and the short exposure time based on the ratio value. Details of this step may be referred to relevant description in Step S630 of FIG. 6, so no further details in this respect will be reiterated hereinafter.

Then, at Step 740, the processing unit 240 may retrieve at least one specific image corresponding to the long exposure time and the short exposure time from the plurality of additional images.

It should be noted that Step S740 differs from Step S640 of FIG. 6 in that at Step S640, the specific image is retrieved from the preview images, while at Step S740, the specific image is retrieved from the additional images that are not displayed in the display unit 210.

At Step S750, the processing unit 240 may combine the first image and the at least one specific image as the processed image.

Since in the embodiment described in FIG. 7, the specific image is retrieved from the additional images that are not displayed in the display unit 210, the specific image suitable to be combined with the first image to form the processed image may be found under the premise that there is no influence on the preview images. Meanwhile, since the at least one specific images obtained by the processing unit 240 from the preview images respectively correspond to appropriate exposure times, the preferable processed image (e.g. clear shadow details and no over exposure in the bright scene) may be obtained after the at least one specific images are combined with the first image.

In addition, an embodiment of the invention further provides a hardware framework of an electronic apparatus capable of achieving a more preferable processing efficiency when performing the HDR function.

Figure 8:
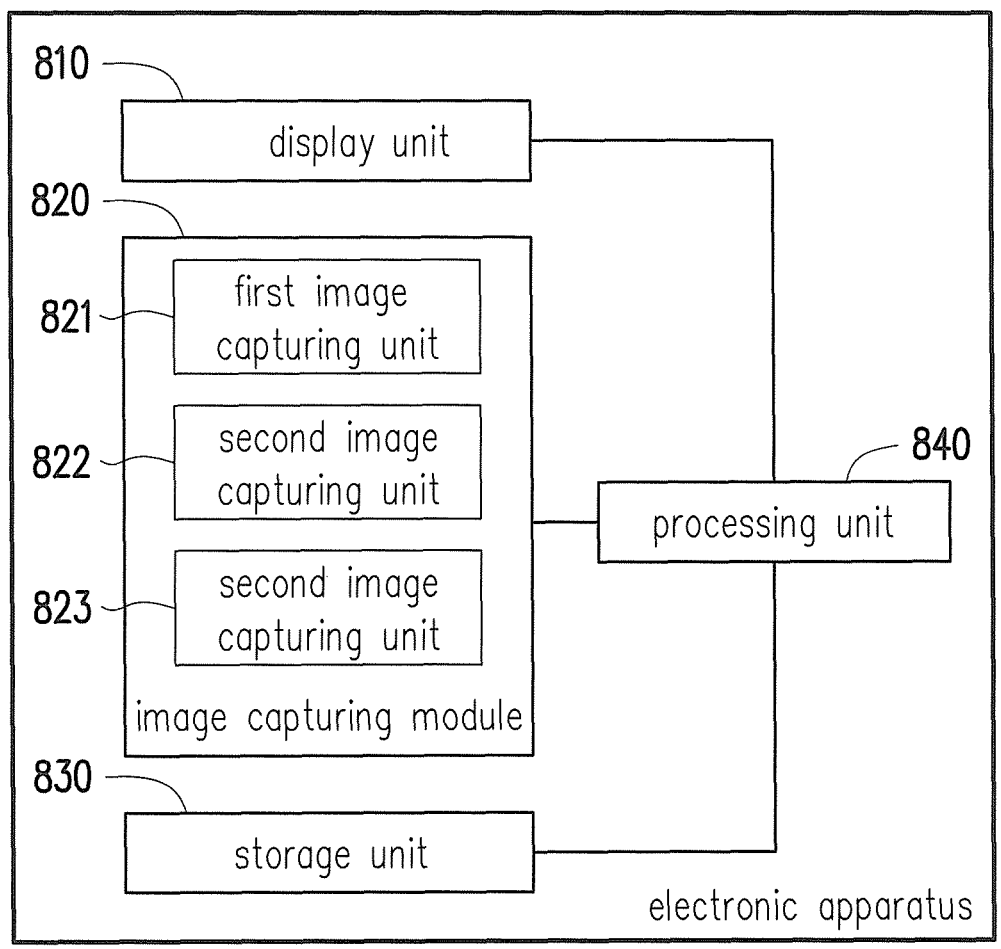
FIG. 8 is a functional block diagram illustrating an electronic apparatus according to an embodiment of the invention.

Referring to FIG. 8, FIG. 8 is a functional block diagram illustrating an electronic apparatus according to an embodiment of the invention. In this embodiment, an electronic apparatus 800 includes a display unit 810, an image capturing module 820, a storage unit 830, and a processing unit 840. The image capturing module 820 includes a first image capturing unit and second image capturing units 822 and 823. Details regarding the display unit 810, the image capturing module 820, the storage unit 830, and the processing unit 810 may be referred to relevant description of the elements in the embodiment shown in FIG. 2. Thus, no further details in this respect will be reiterated hereinafter. The first image capturing unit 821 and the second image capturing units 822 and 823 are respectively a CCD element and/or CMOS element, for example, and may respectively correspond to different exposure times.

Figure 9:
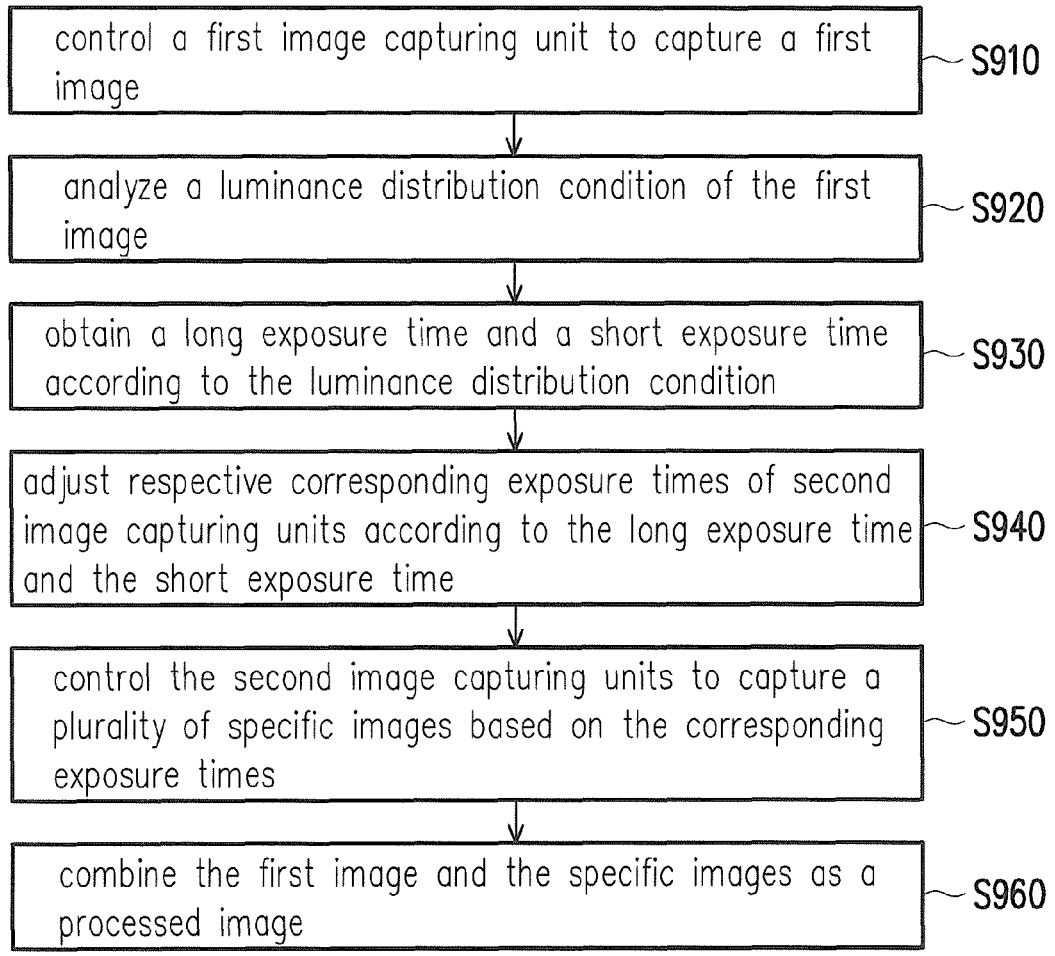
FIG. 9 is a flowchart illustrating a dynamic exposure adjusting method according to an embodiment of the invention.

FIG. 9 is a flowchart illustrating a dynamic exposure adjusting method according to an embodiment of the invention. The method described in the embodiment is suitable for the electronic apparatus 800 shown in FIG. 8. In the following, each step of the embodiment is described with the elements shown in FIG. 8.

First of all, at Step S910, the processing unit 840 may control the first image capturing unit 821 to capture the first image. Then, at Step S920, the processing unit 840 may analyze the luminance distribution condition of the first image. At Step 930, the processing unit 840 may obtain the long exposure time and the short exposure time according to the luminance distribution condition. Details of Steps S910 to S930 may be referred to the description in the previous embodiments, and no further details in this respect will be reiterated hereinafter.

At Step S940, the processing unit 840 may adjust respective corresponding exposure times of the second image capturing units 822 and 823 according to the long exposure time and the short exposure time. For example, after the processing unit 840 performs Step S930 to obtain the long exposure time and the short exposure time, the processing unit 840 sets the exposure time of the second image capturing unit 822 to be the long exposure time, and set the exposure time of the second image capturing unit 823 to be the short exposure time.

Taking the exemplary numerical values mentioned in the previous embodiments for example, if the obtained long exposure time and the short exposure time are 8 times and ½ times respectively, the processing unit 840 may set the exposure time of the second image capturing unit 822 to be 8 times of the exposure time of the first image. In addition, the processing unit 840 may set the exposure time of the second image capturing unit 823 to be ½ times of the exposure time of the first image. In an embodiment, the exposure time of the first image is an exposure time of the first image capturing unit 821.

Another example is that, if the obtained long exposure time and the short exposure time are 3 times and ½ times respectively, the processing unit 840 may set the exposure time of the second image capturing unit 822 to be 3 times of the exposure time of the first image. In addition, the processing unit 840 may set the exposure time of the second image capturing unit 823 to be ½ times of the exposure time of the first image.

Then, at Step S950, the processing unit 840 may control the second image capturing units 822 and 823 to capture the plurality of specific images (e.g. the long exposure picture and the short exposure picture) based on the corresponding exposure times. Namely, the processing unit 840 may control the second image capturing units 822 and 823 to capture the corresponding specific images based on corresponding multiples.

At Step S960, the processing unit 840 may combine the first image and the plurality of specific image as the processed image.

In brief, the processing unit 840 may simultaneously control the second image capturing units 822 and 823 to capture the corresponding specific images after the long exposure time and the short exposure time are determined, and it is not necessary to use the image capturing module 220 to take the long exposure picture and short exposure picture at different time points like the electronic apparatus 200 shown in FIG. 2. Thus, the electronic apparatus 800 has a more preferable image processing efficiency than the electronic apparatus 200.

More specifically, when the electronic apparatus 800 takes a more dynamic object, since the processing unit 840 may simultaneously control the second image capturing units 822 and 823 to capture the corresponding specific pictures, the processing unit 840 may eliminate a difference in image due to a difference in time between the specific images in a more efficient way, so as to obtain a more preferable processed image.

In view of the foregoing, the dynamic exposure adjusting method and the electronic apparatus using the same may adaptively adjust the long exposure time and short exposure time based on the scene that the first image corresponds to. In this way, regardless of the scene that the first image corresponds to, the dynamic exposure adjusting method provided in the embodiment of the invention is capable of obtaining a preferable processed picture (e.g. having clear shadow details and no over exposure in a bright scene).

In addition, the method provided by the embodiments of the invention is also capable of retrieving the specific images corresponding to the long exposure time and the short exposure time from the preview images or the additional images that are not displayed in the display unit after obtaining the long exposure time and short exposure time, and combining the specific images with the first image. In this way, the effect of adjusting the long exposure time and the short exposure time may be equivalently achieved, so as to also obtain the preferable processed picture.

Furthermore, the electronic apparatus provided in the embodiments of the invention may further adjust the exposure times of the plurality of image capturing units based on the obtained long exposure time and short exposure time, and control the image capturing units to simultaneously capture the specific images based on the corresponding exposure times. Thus, the electronic apparatus provided in the embodiments of the invention is suitable to shoot a more dynamic object.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A dynamic exposure adjusting method adapted for an electronic apparatus, comprising:
   capturing a plurality of preview images, a plurality of additional images, and a first image, wherein the additional images are not displayed in a display unit of the electronic apparatus;
   dividing the first image into a plurality of blocks;
   analyzing a luminance distribution condition of the first image, wherein the analyzing includes counting a first number of bright blocks above a predetermined luminance threshold and a second number of dark blocks below said predetermined luminance threshold;
   obtaining a long exposure time and a short exposure time according to the luminance distribution condition of the first image at least by, wherein the obtaining includes calculating a ratio value between the first number and the second number and obtaining the long exposure time and the short exposure time according to the ratio value;
   selecting and retrieving at least one specific image corresponding to the long exposure time and the short exposure time from the captured additional images; and
   combining the first image and the at least one specific image as one processed image.

2. The method as claimed in claim 1, wherein analyzing the luminance distribution condition of the first image comprises:
   individually calculating a luminance value corresponding to each of the blocks; and
   based on the luminance values of the blocks, calculating the first number of the bright blocks in the first image and the second number of a the dark blocks in the first image, wherein the luminance value of each of the bright blocks is higher than the predetermined luminance threshold, and the luminance value of each of the dark blocks is lower than the predetermined luminance threshold.

3. The method as claimed in claim 1, wherein analyzing the luminance distribution condition of the first image comprises:
   generating a luminance histogram associated with the first image, wherein the luminance histogram comprises a number of a plurality of data corresponding to a plurality of luminance values;
   categorizing the data having a luminance value higher than a predetermined luminance threshold in the data as a bright block;
   categorizing the data having a luminance value lower than the predetermined luminance threshold in the data as a dark block; and
   calculating a first number of the bright block and a second number of the dark block.

4. An electronic apparatus, comprising:
   a display unit;
   an image capturing module;
   a storage unit, storing a plurality of modules; and
   a processing unit, coupled with the display unit, the image capturing module, and the storage unit, and accessing the modules to perform steps as follows:
   controlling the image capturing module to capture a plurality of preview images, a plurality of additional images, and a first image, wherein the additional images are not displayed in the display unit of the electronic apparatus;

dividing the first image into a plurality of blocks;
analyzing a luminance distribution condition of the first image, wherein the analyzing includes counting a first number of bright blocks above a predetermined luminance threshold and a second number of dark blocks below said predetermined luminance threshold;
obtaining a long exposure time and a short exposure time according to the luminance distribution condition of the first image at least by, wherein the obtaining includes calculating a ratio value between the first number and the second number and obtaining the long exposure time and the short exposure time according to the ratio value;
selecting and retrieving at least one specific image corresponding to the long exposure time and the short exposure time from the captured additional images; and
combining the first image and the at least one specific image as one processed image.

5. The electronic apparatus as claimed in claim 4, wherein the processing unit is configured to:
individually calculate a luminance value corresponding to each of the blocks; and
based on the luminance value of each of the blocks, calculate the first number of the bright blocks in the first image and the second number of the dark blocks in the first image, wherein the luminance value of each of the bright blocks is higher than the predetermined luminance threshold, and the luminance value of each of the dark blocks is lower than the predetermined luminance threshold.

6. The electronic apparatus as claimed in claim 4, wherein the processing unit is configured to:
generate a luminance histogram associated with the first image, wherein the luminance histogram comprises a number of a plurality of data corresponding to a plurality of luminance values;
categorize the data having a luminance value higher than a predetermined luminance threshold in the data as a bright block;
categorize the data having a luminance value lower than the predetermined luminance threshold in the data as a dark block; and
calculate a first number of the bright block and a second number of the dark block.

7. The method as claimed in claim 1, wherein the long exposure time and the short exposure time are obtained after the additional images are captured.

* * * * *